United States Patent
Krueger et al.

[11] Patent Number: 5,872,651
[45] Date of Patent: Feb. 16, 1999

[54] CONDENSER SYSTEM FOR MICROSCOPES

[75] Inventors: Rolf Krueger, Butzbach; Hans-Werner Stankewitz, Wetzlar; Ute Gehrmann, Muenzenberg; Peter Euteneuer, Lahnau, all of Germany

[73] Assignee: Leica Mikroskopie und Systeme GmbH, Wetzlar, Germany

[21] Appl. No.: 530,190

[22] PCT Filed: Feb. 8, 1995

[86] PCT No.: PCT/DE95/00160

§ 371 Date: Oct. 6, 1995

§ 102(e) Date: Oct. 6, 1995

[87] PCT Pub. No.: WO95/22072

PCT Pub. Date: Aug. 17, 1995

[30] Foreign Application Priority Data

Feb. 11, 1994 [DE] Germany .......................... 44 04 283.3

[51] Int. Cl.$^6$ .......................... G02B 21/00; G02B 21/22
[52] U.S. Cl. .......................... 359/370; 359/370; 359/371; 359/377; 359/378; 359/381; 359/384; 359/387
[58] Field of Search .......................... 359/370, 371, 359/377, 378, 379, 381, 383, 384, 387, 388, 386, 495

[56] References Cited

U.S. PATENT DOCUMENTS

| | | | |
|---|---|---|---|
| 3,658,405 | 4/1972 | Pluta | 359/371 |
| 3,790,254 | 2/1974 | Rybicki et al. | 359/672 |
| 3,833,283 | 9/1974 | Stankewitz | 359/388 |
| 4,363,532 | 12/1982 | Weber | 359/381 |
| 4,407,569 | 10/1983 | Piller et al. | 359/387 |
| 4,472,023 | 9/1984 | Yamamoto | 359/370 |
| 4,946,265 | 8/1990 | Schimizu et al. | 359/381 |
| 4,961,636 | 10/1990 | Gaul et al. | 359/381 |
| 4,964,707 | 10/1990 | Hayashi | 359/495 |
| 5,420,717 | 5/1995 | Tabata | 359/371 |
| 5,539,573 | 7/1996 | Schalz et al. | 359/384 |

FOREIGN PATENT DOCUMENTS

| | | |
|---|---|---|
| 0 029 955 | 6/1981 | European Pat. Off. |
| 94/07169 | 3/1994 | WIPO |

Primary Examiner—Cassandra C. Spyrou
Assistant Examiner—Mohammad Y. Sikder
Attorney, Agent, or Firm—Foley & Lardner

[57] ABSTRACT

An exchangeable condenser system for a phase-contrast illuminating system (12) for microscopes has a plurality of different light rings (5), arranged on a nosepiece plate (4), assigned to the condenser optical system (6). The condenser optical system (6) can be exchanged independently of the light rings (5), the focal lengths $F_n$ of the exchangeable condenser optical systems (6) being selected relative to one another in the ratio $F_n = F_0 * X^n$ and the average diameters $D_n$ of the light rings (5) being selected relative to one another in the ratio $D_n = D_0 * X^n$, where $X > 0$, $n = 0, 1, 2, 3, \ldots$.

20 Claims, 5 Drawing Sheets

CONDENSER SYSTEM FOR MICROSCOPES

BACKGROUND

The invention relates to a condenser system for a phase-contrast illumination system for microscopes and to a condenser system for a fringe-contrast illumination system for microscopes.

In condenser systems for a phase-contrast illumination system in microscopes, it is known to use different condensers with a set of light rings specially adapted to each individual condenser. A set of light rings contains individual light rings having different light ring diameters. In microscopes having various objectives of differing magnifying power, it is usually necessary to make available a plurality of different light rings having different diameters per condenser. It has previously been necessary for this combination of condenser and set of light rings to be arranged in a mechanically expensive way in the illuminating beam path. The arrangement of the set of light rings with the associated condenser optical system in the illuminating beam path was made in a known embodiment such that the set of light rings was arranged together with the condenser optical system in a separate nosepiece. The entire nosepiece was exchanged when changing the condenser optical system. However, this required the exchanging guides of the nosepiece and the guides on the microscope to be precisely manufactured, and in addition required adjusting elements for centering the condenser to be made available. In addition to the substantial manufacturing outlay for such exchangeable nosepieces, it is also disadvantageous in this known solution that a special set of light rings in a special nosepiece must be made available for each condenser optical system.

DE 23 37 653, which corresponds to U.S. Pat. No. 3,790,254, discloses a condenser system for phase-contrast illumination system in microscopes, in which a plurality of condensers having the same focal length and different free working distances are represented and described. Owing to this special row of condensers, a single set of light rings can be used for different condensers.

However, in practice the row of condensers described can be used only to a limited extent, since it is possible to realize optically only a free working distance amounting to a maximum of 5.5 mm. At larger distances, up to 70 mm, such as are urgently required in inverted microscopes for viewing objects in petri dishes, microtitration plates, culture flasks and the like, optical reasons preclude the realization of a constant focal length of the different condenser optical systems.

In known condenser systems for a fringe-contrast illumination system with microscopes, there is likewise the problem that the very expensive Wollaston prisms have to be adapted to the objectives employed, which have different magnifying powers, and to condenser optical systems. There is a need here, as well, for a plurality of specially built prisms for each condenser optical system which are likewise arranged in a nosepiece plate upstream of the condenser. The use of the prisms depends in this case on the respective magnifying powers and focal lengths of the objectives and condenser optical systems.

SUMMARY OF THE INVENTION

It is therefore the object of the present invention to specify, starting from the known prior art, a condenser system for a microscopical phase-contrast illumination system which permits the use of a single set of light rings in conjunction with different focal lengths of the condenser optical systems.

This object is achieved according to the invention by means of the features specified below.

A further object of the invention is to specify, starting from the known prior art, a condenser system for a microscopical fringe-contrast illumination system which permits the use of a single set of Wollaston prisms in conjunction with different focal lengths of the condenser optical systems.

This object is achieved according to the invention by means of the features specified below.

Advantageous variations of the invention are also described below.

In the present invention, a condenser system is made available which has a plurality of condensers of different focal length in each case and a working distance from the specimen which is of differing size. The condenser optical systems have a common magnification factor between themselves. The condenser optical systems are assigned a single set of light rings which has individual light rings with different average light ring diameters.

The steps between the individual diameters are adapted to the common factor of the focal lengths of the condenser optical systems. The result of this is that the different light rings within a set of light rings can be used in conjunction with the different condenser optical systems.

In a fringe-contrast illumination system, the condenser optical systems are used with different focal lengths and with different working distances from the specimen. The magnification factor, common here as well, of the condenser optical systems is adapted here to the common magnification factor between the individual viewing objectives.

This objective renders it possible to use the Wollaston prisms, arranged on the condenser side, for all combinations of condenser/viewing optical systems without expensive retrofitting, conversion or adjustment.

Given a suitable choice of a common magnification factor for the viewing objectives and the condenser optical systems, and given the resulting light ring diameters, it is possible to create a system which can be jointly used both for a phase-contrast and for a fringecontrast illumination system.

DESCRIPTION OF THE DRAWINGS

An embodiment of the invention which fulfills this in an advantageous way is explained in more detail in an exemplary embodiment with the aid of the diagrammatic drawings, in which.

DETAILED DESCRIPTION OF PREFERRED EMBODIMENTS

Figure 1:
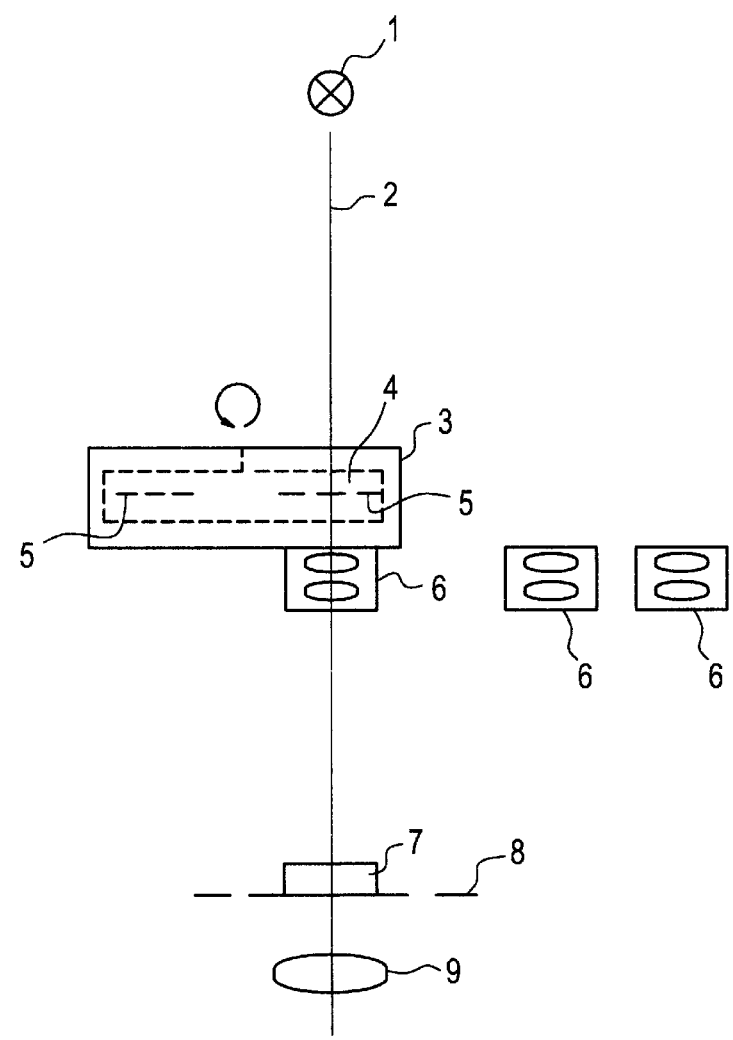
FIG. 1 shows an illuminating beam path for an inverted microscope having a nosepiece plate arranged therein and having a condenser optical system.
Figure 8:
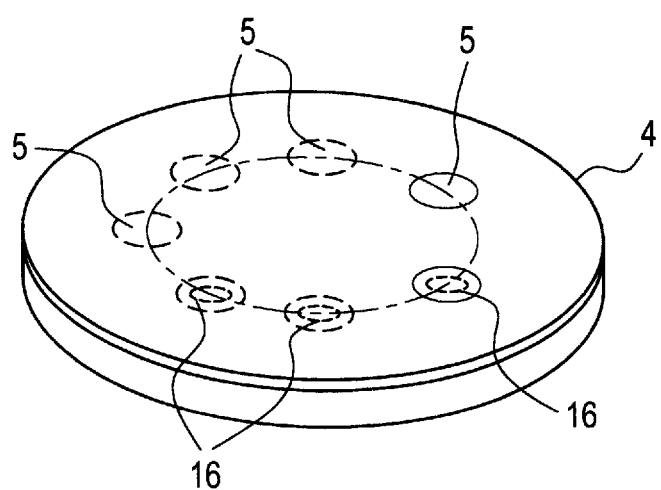
FIG. 8 shows a nosepiece plate.

FIG. 1 shows an illuminating beam path 2 for an inverted microscope (not represented) having a light source 1 and a mount 3. A nosepiece plate 4 is arranged rotatably in this mount 3. The nosepiece plate 4 serves to hold a set of light rings composed of individual light rings 5 and to hold a set of individual Wollaston prisms 16 as shown in FIG. 8. The mount 3 further serves as a holder for a condenser optical system 6 which is changeably fastened to the mount 3. In this representation, the object plane 8 is shown in the further course of the illuminating beam path 2 together with the specimen 7 and the downstream objective 9.

The individual light rings 5 or Wollaston prisms 16 can be successively brought into the illuminating beam path 2 via the rotatably mounted nosepiece plate 4. The condenser optical system 6 can be exchanged for another condenser optical system 6 via a threaded joint (not represented) on the mount 3.

Figure 2:
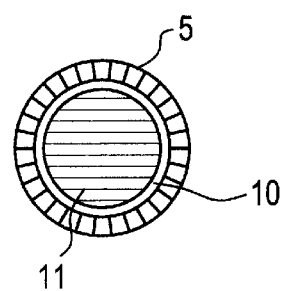
FIG. 2 shows a light ring in plan view.

A light ring 5 is shown in a plan view in FIG. 2. The light ring 5 is shown in the usual fashion by means of its opaque surfaces (shown hatched) and its transparent, annular surface 10. The mean diameter of the light ring 5 is marked by the reference numeral 11.

Figure 3:
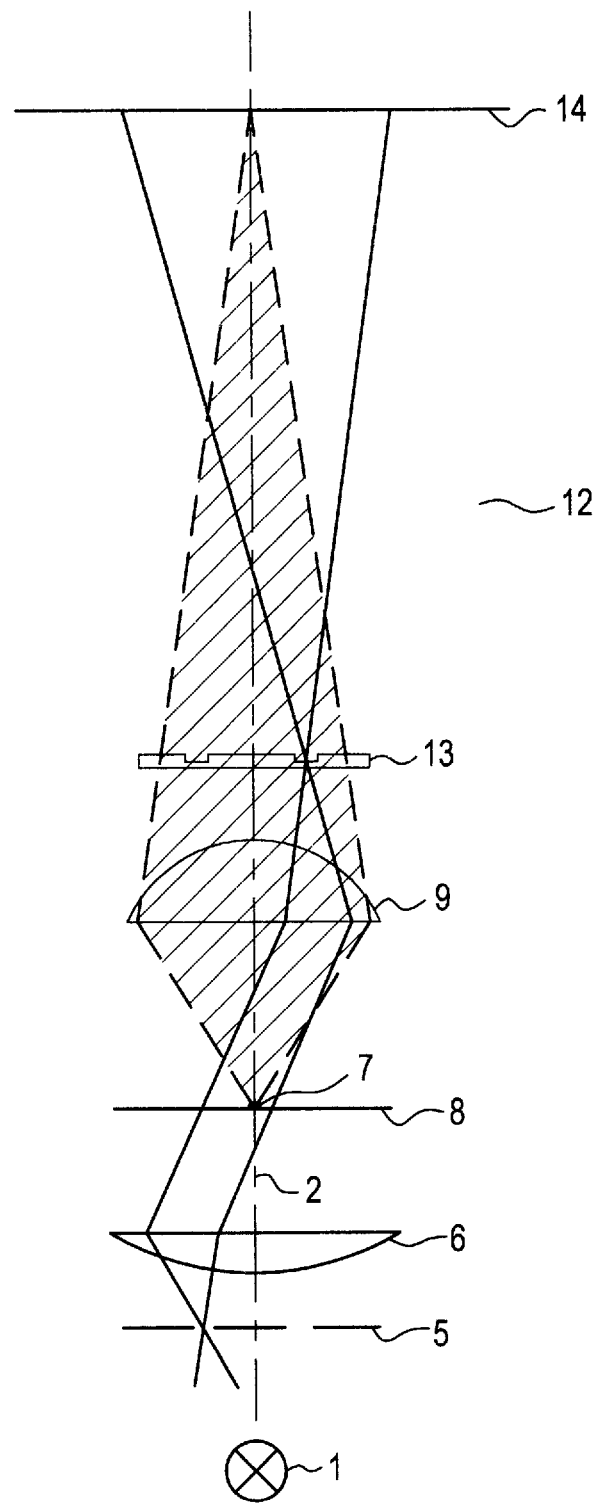
FIG. 3 shows a representation of the principle of a phase-contrast illuminating beam path.

Shown in FIG. 3 is a sketch of the principle of a possible phase-contrast illumination system 12. The light coming from the light source 1 passes through the annular opening of the light ring 5 and is aligned parallel with the condenser optical system 6. This parallel beam penetrates the specimen plane 8 and is focused onto a phase plate 13 via the objective 9. The phase plate 13 can be designed, for example, as a plane parallel glass plate having an annular etching, a phase ring, onto which the light ring 5 is imaged. Via the phase plate 13, the phase of this light is shifted with respect to the light coming from the specimen. The beam diverges from the phase plate 13 into the imaging plane 14 (intermediate image plane). The light deflected (represented hatched) by the specimen 7 is guided via the objective 9 and the phase plate 13 and imaged in a focused fashion in the plane 14. It is achieved as a result that the phase change of the light, conditioned by the specimen 7, is converted into a change in intensity of the light in the imaging plane 14.

Figure 4:
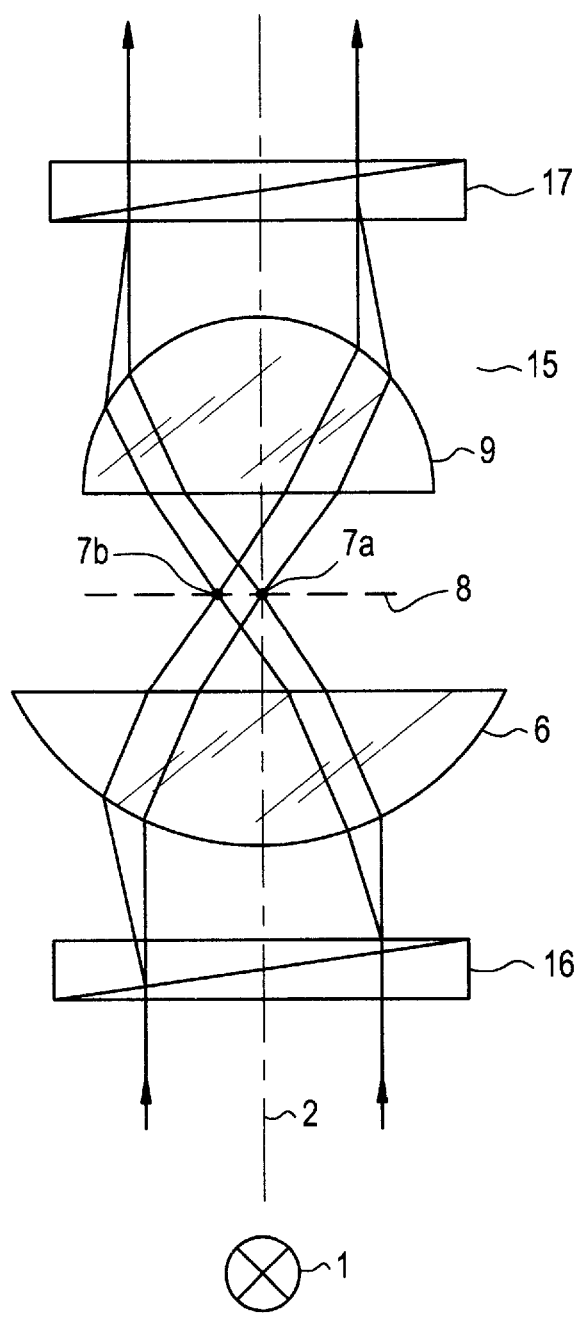
FIG. 4 shows a representation of the principle of a fringe-contrast illuminating beam path.

FIG. 4 shows a sketch of the principle of a fringe-contrast illumination system 15 having a light source 1, a Wollaston prism 16 arranged on the condenser side, a condenser optical system 6, a specimen plate 8 with the neighboring specimen points 7a, 7b and the magnifying optical system 9. A Wollaston prism 17 on the objective side is arranged downstream of this optical system 9. In the illuminating arrangement represented here, the beams coming from the light source 1 are split up at the Wollaston prism 16 into two individual beams of which each beam illuminates a neighboring specimen point 7a and 7b. The two individual beams are guided together again via the Wollaston prism 17 and interfere. Conclusions can be drawn on the refractive index and thickness of the specimens from the resulting path differences.

In the case of the present condenser system, it is necessary given a phase-contrast illumination system to adapt the average diameters 11 of the individual light rings 5 to the condenser focal lengths employed. Given an initial focal length $F_0$ of 12 mm and a free working distance of 1 mm from the specimen 7 for the condenser optical system 6 and a factor of X=2 and n=0,1,2 . . . , the formula $F_n=F_0*X^n$ produces for further condenser optical systems $F_1$ and $F_2$ a focal length of 24 mm with a free working distance of 23 mm, and 48 mm with a free working distance of 70 mm. The average diameters 11 of the light rings 5 can be calculated from this focal length ratio using the formula $D_n=D_0*X^n$. It is known that the output diameter $D_0$ of the light rings 5 is to amount in practice to approximately half the diameter of the objective aperture. Starting from this value, $D_0$ is fixed at 1.35 mm. The formula and the selected focal length ratio of the condenser optical systems 6 produce for the light rings the average diameters of $D_0$=1.35 mm, $D_1$=2.7 mm, $D_2$=5.4 mm and $D_3$=10.8 mm.

Given such a configuration of the focal lengths of the condenser optical systems 6 and the diameters of the individual light rings 5, all the light rings $D_0$-$D_3$ can be used in the case of the condenser $F_1$. The use of the light rings $D_1$-$D_3$ follows for the condenser $F_2$, while the light rings having the diameters $D_0$-$D_2$ can be used for the condenser optical system $F_0$.

Figure 5:
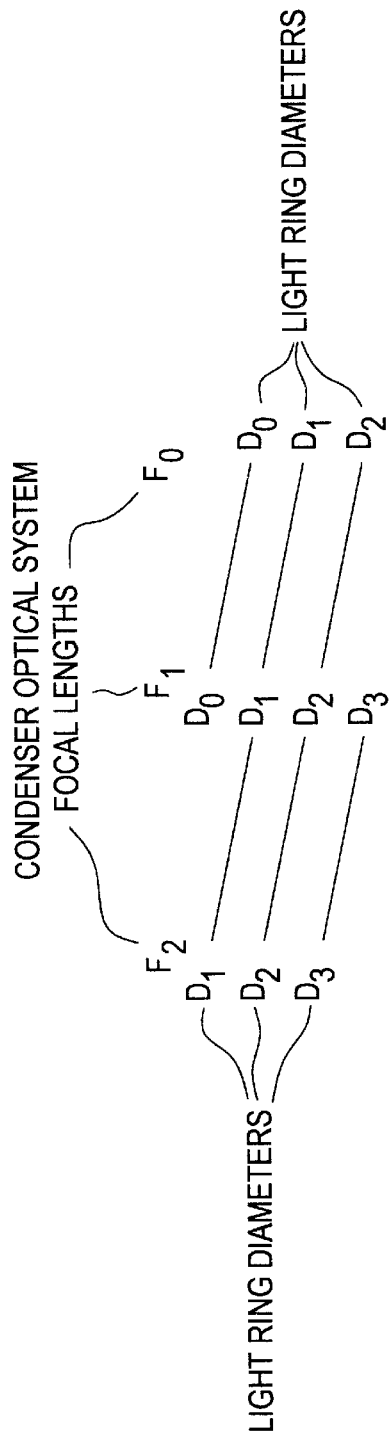
FIG. 5 shows the different takeover possibilities of light rings of different condensers.

The various receiving possibilities are sketched in FIG. 5, $F_0$-$F_2$ marking the focal lengths of the condenser optical system and $D_0$-$D_3$ the individual light ring diameters.

It is thus possible given this staggering in the condensers 6 and light rings 5 for the use of a plurality of sets of light rings to be dispensed with in an optimum way. This also produces the advantage that the individual light rings of the set of light rings need no longer be exchanged, and thus the extra expenditure of variable adjusting devices can be eliminated. The mount 3 with the nosepiece plate is positioned only during manufacture and is permanently connected to the microscope.

In the case of a fringe-contrast illumination system, the abovementioned focal length ratio between the individual condenser optical systems 6 is particularly advantageous, since in this type of illumination there is a fixed relationship between the magnification ratios of the condensers 6 and the different magnifications of the objectives 9.

The focal lengths of the objectives 9 can be calculated starting from the abovementioned focal lengths of the condenser optical systems 6. The objective series or the condenser series is yielded in accordance with the formula $F_n$(objective)=$F_0$(objective)*$X^n$, for an output focal length of $F_0$(objective)=5 mm, $F_1$(objective)=10 mm, $F_2$(objective) =20 mm and $F_3$(objective)=40 mm. These focal lengths correspond to a set of objectives, which is normally used, with objectives 40×, 20×, 10×and 5×.

It is, of course, also possible to use the abovementioned formulae to determine the individual focal lengths of the condensers starting from the available objective series of different magnification.

Because of the identical magnification ratios between the condensers and objectives, the Wollaston prism designed for the objective 40×=5 mm focal length can be used both in the case of the objectives $F_0$/condenser F=12 mm and for the objective $F_1$/condenser F=24 mm and objective $F_2$/condenser F=48 mm. In the case of other objective/ condenser combinations, the further adapted Wollaston prisms can be used analogously. It is thus possible using only three different Wollaston prisms to achieve all the abovementioned objective/condenser combinations.

Figure 6:
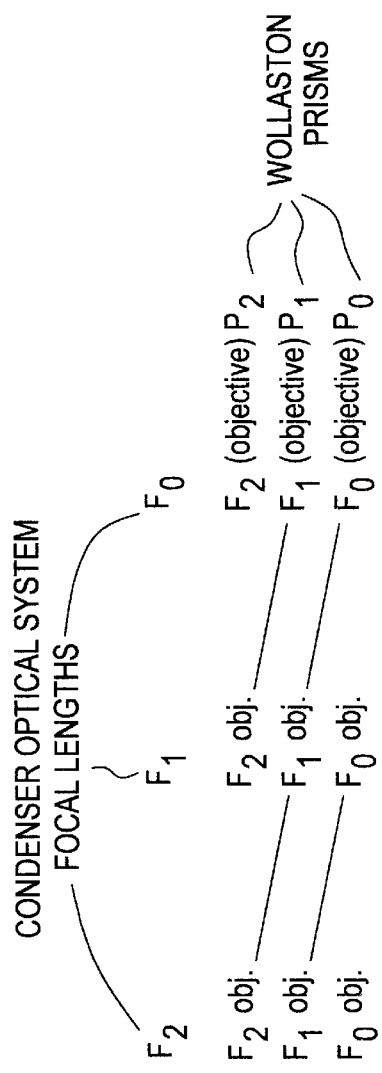
FIG. 6 shows the different takeover possibilities of Wollaston prisms for different condenser/objective combinations.

The various receiving possibilities are sketched in FIG. 6, $F_0$-$F_2$ characterizing the focal lengths of the individual condenser optical systems, $F_0$(objective) -$F_2$(objective) characterizing the individual focal lengths of the objectives, and $P_0$-$P_2$ characterizing the various Wollaston prisms. The prism $P_0$ can accordingly be used in the combination $F_0$/$F_0$ (objective), $F_1$/$F_1$(objective) and $F_2$/$F_2$(objective).

Apart from the optimum use of a single set of light rings, the condenser system described here is also optimized for the use of Wollaston prisms.

Figure 7:
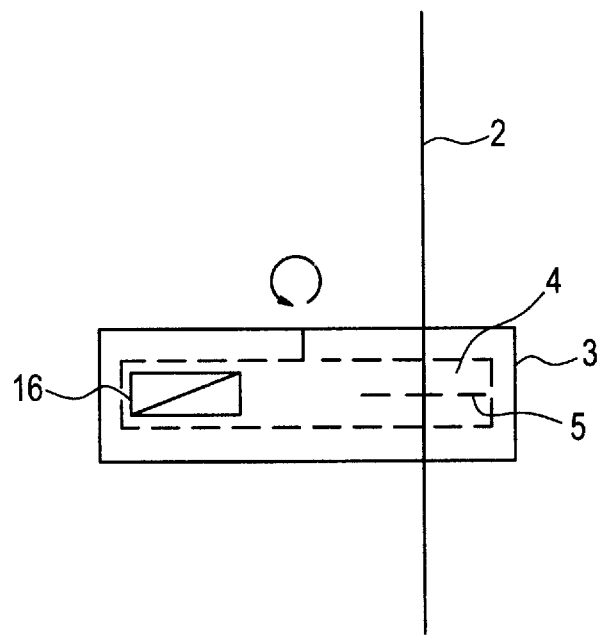
FIG. 7 shows a modification of the invention.

The invention is not, of course, restricted to the advantageous exemplary embodiment described. For example, light ring(s) 5 and Wollaston prism(s) 16 can be arranged in the same nosepiece plate 4, as shown in FIG. 7. Other magnification ratios can, of course, easily be transmitted in accordance with the given formulae.

List of reference symbols

1—light source
2—illuminating beam path
3—mount
4—nosepiece plate
5—light ring
6—condenser optical system
7—specimen
7a, 7b—neighboring specimen points
8—specimen plane
9—objective
10—transparent part of the light ring 5
11—average diameter of the light ring 5
12—phase-contrast illumination system
13—phase plate
14—imaging plane
15—fringe-contrast illumination system
16—wollaston prism
17—wollaston prism

We claim:

1. Exchangeable condenser system for a phase-contrast illumination system (12) in microscopes, having a condenser optical system (6) and different light rings (5) which are assigned to the condenser optical system and arranged on a nosepiece plate (4), the light rings having an opaque center area and a light-transmitting annular area surrounding the center area, characterized in that the condenser optical system (6) can be exchanged independently of the light rings (5), the focal lengths $F_n$ of the condenser optical systems (6) being selected relative to one another in the ratio $F_n=F_0*X^n$ and the average diameters $D_n$ of the light rings (5) being selected relative to one another in the ratio $D_n=D_0*X^n$ where $F_0$ is an initial focal length of the condenser optical systems, $D_0$ is an initial average diameter of the light rings, X>0, and n is an integer equal to or greater than zero.

2. Exchangeable condenser system according to claim 1, characterized in that X=2, $F_0$=12 mm and $D_0$=2.7 mm.

3. Exchangeable condenser system according to claim 2, characterized in that for the purpose of switching over from a phase-contrast illumination system to a fringe-contrast illumination system, the light rings and Wollaston prisms are arranged in different mounts of the same nosepiece plate.

4. Exchangeable condenser system according to claim 2, characterized in that three condenser optical systems and four light rings are provided.

5. Exchangeable condenser system according to claim 2, characterized in that three condenser optical systems and three Wollaston prisms are provided.

6. Exchangeable condenser system according to claim 1, characterized in that for the purpose of switching over from a phase-contrast illumination system (12) to a fringe-contrast illumination system (15), the light rings (5) and Wollaston prisms (16) are arranged in different mounts of the same nosepiece plate (4).

7. Exchangeable condenser system according to claim 6, characterized in that three condenser optical systems and four light rings are provided.

8. Exchangeable condenser system according to claim 6, characterized in that three condenser optical systems and three Wollaston prisms are provided.

9. Exchangeable condenser system according to claim 1, characterized in that three condenser optical systems (6) and four light rings (5) are provided.

10. Exchangeable condenser system according to claim 1, characterized in that three condenser optical systems and three Wollaston prisms are provided.

11. An exchangeable condenser system for a phase-contrast illumination system for a microscope, comprising:

a condenser optical system;

a nosepiece plate;

different light rings which are assigned to the condenser optical system and are arranged on the nosepiece plate, the light rings having an opaque center area and a light-transmitting annular area surrounding the center area;

wherein the condenser optical system can be exchanged independently of the light rings, focal lengths $F_n$ of condenser optical systems being selected relative to one another in the ratio $F_n$ of the condenser optical systems (6) being selected relative to one another in the ratio $F_n=F_0*X^n$ and the average diameters $D_n$ of the light rings (5) being selected relative to one another in the ratio $D_n=D_0*X^n$ where $F_0$ is an initial focal length of the condenser optical systems, $D_0$ is an initial average diameter of the light rings, X>0, and n is an integer equal to or greater than zero.

12. An exchangeable condenser system according to claim 11, wherein X=2, $F_0$=12 mm and $D_0$=2.7 mm.

13. An exchangeable condenser system according to claim 12, wherein for the purpose of switching over from a phase-contrast illumination system to a fringe-contrast illumination system, the light rings and Wollaston prisms are arranged in different mounts of said nosepiece plate.

14. An exchangeable condenser system according to claim 12, wherein three condenser optical systems and three Wollaston prisms are provided.

15. An exchangeable condenser system according to claim 12, wherein three condenser optical systems and four light rings are provided.

16. An exchangeable condenser system according to claim 11, wherein for the purpose of switching over from a phase-contrast illumination system to a fringe-contrast illumination system, the light rings and Wollaston prisms are arranged in different mounts of said nosepiece plate.

17. An exchangeable condenser system according to claim 16, wherein three condenser optical systems and four light rings are provided.

18. An exchangeable condenser system according to claim 16, wherein three condenser optical systems and three Wollaston prisms are provided.

19. An exchangeable condenser system according to claim 11, wherein three condenser optical systems and four light rings are provided.

20. An exchangeable condenser system according to claim 11, wherein three condenser optical systems and three Wollaston prisms are provided.

* * * * *

UNITED STATES PATENT AND TRADEMARK OFFICE
CERTIFICATE OF CORRECTION

PATENT NO. : 5,872,651
DATED : February 16, 1999
INVENTOR(S) : Rolf KRUEGER et al.

It is certified that error appears in the above-identified patent and that said Letters Patent is hereby corrected as shown below:

Column 1, line 23 "The entire nosepiecc" should read --The entire nosepiece--. Column 2, line 40, wherein "fringecontrast" should read --fringe-contrast--. Column 6, Claim 11, lines 23 and 24, delete "$F_n$ of the condenser optical systems (6) being selected relative to one another in the ratio" and line 26, delete "(5)".

Signed and Sealed this

Twenty-second Day of August, 2000

Attest:

Attesting Officer

Q. TODD DICKINSON

Director of Patents and Trademarks